(12) United States Patent
Pieronek

(10) Patent No.: US 10,661,532 B2
(45) Date of Patent: May 26, 2020

(54) CHASSIS COMPONENT HAVING HIGH DURABILITY

(71) Applicants: ThyssenKrupp Steel Europe AG, Duisburg (DE); thyssenkrupp AG, Essen (DE)

(72) Inventor: David Pieronek, Dortmund (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/324,602

(22) PCT Filed: Aug. 8, 2017

(86) PCT No.: PCT/EP2017/070060
§ 371 (c)(1),
(2) Date: Feb. 11, 2019

(87) PCT Pub. No.: WO2018/029191
PCT Pub. Date: Feb. 15, 2018

(65) Prior Publication Data
US 2019/0176436 A1    Jun. 13, 2019

(30) Foreign Application Priority Data

Aug. 12, 2016 (DE) ........................ 10 2016 115 036

(51) Int. Cl.
*B32B 15/01* (2006.01)
*B60B 3/04* (2006.01)
(Continued)

(52) U.S. Cl.
CPC ............ *B32B 15/011* (2013.01); *B21D 22/20* (2013.01); *B21D 22/208* (2013.01); *B32B 15/00* (2013.01);
(Continued)

(58) Field of Classification Search
CPC ....... B32B 15/00; B32B 15/01; B32B 15/011; B32B 15/04; B32B 15/043; B32B 15/18;
(Continued)

(56) References Cited

U.S. PATENT DOCUMENTS 9,975,310 B2    5/2018   Hilfrich et al.
2007/0256762 A1  11/2007  Brodt et al.
(Continued)

FOREIGN PATENT DOCUMENTS

DE    102006019567 B3    11/2007
DE    102007019485 A1    11/2008
(Continued)

OTHER PUBLICATIONS

Machine Translation, Braun et al., DE 102007019485, Nov. 2008. (Year: 2008).*

*Primary Examiner* — Michael E. La Villa
(74) *Attorney, Agent, or Firm* — The Webb Law Firm

(57) ABSTRACT

A chassis component for a motor vehicle is disclosed. The chassis component (1) is manufactured at least partially from a multi-layer steel sheet (10, 20, 30). The multi-layer steel sheet (10, 20, 30) includes at least three steel layers, including two outer steel layers (11, 12; 21, 22; 31, 32) and one inner steel layer (13, 23, 33). At least one outer steel layer (11, 12; 21, 22; 31, 32) of the multi-layer steel sheet (10, 20, 30) has a tensile strength of at least 1200 MPa. A method for producing a chassis component for a motor vehicle, in particular a wheel (1) or a part thereof, is also disclosed.

16 Claims, 2 Drawing Sheets

(51) Int. Cl.
| | |
|---|---|
| B60B 21/00 | (2006.01) |
| B60B 3/12 | (2006.01) |
| B32B 15/04 | (2006.01) |
| B60B 3/00 | (2006.01) |
| B32B 15/00 | (2006.01) |
| B32B 15/18 | (2006.01) |
| C21D 8/02 | (2006.01) |
| C21D 8/04 | (2006.01) |
| C21D 8/00 | (2006.01) |
| C21D 7/00 | (2006.01) |
| C21D 7/02 | (2006.01) |
| C21D 7/13 | (2006.01) |
| C22C 38/18 | (2006.01) |
| C22C 38/32 | (2006.01) |
| B21D 22/20 | (2006.01) |
| C22C 38/38 | (2006.01) |
| C22C 38/54 | (2006.01) |
| C21D 9/34 | (2006.01) |
| C22C 38/00 | (2006.01) |
| C22C 38/04 | (2006.01) |

(52) U.S. Cl.
CPC ............. *B32B 15/01* (2013.01); *B32B 15/04* (2013.01); *B32B 15/043* (2013.01); *B32B 15/18* (2013.01); *B60B 3/00* (2013.01); *B60B 3/04* (2013.01); *B60B 3/12* (2013.01); *B60B 21/00* (2013.01); *C21D 7/00* (2013.01); *C21D 7/02* (2013.01); *C21D 7/13* (2013.01); *C21D 8/00* (2013.01); *C21D 8/005* (2013.01); *C21D 8/0205* (2013.01); *C21D 8/0221* (2013.01); *C21D 8/0226* (2013.01); *C21D 8/0231* (2013.01); *C21D 8/0236* (2013.01); *C21D 8/0242* (2013.01); *C21D 8/04* (2013.01); *C21D 8/0405* (2013.01); *C21D 8/0421* (2013.01); *C21D 8/0442* (2013.01); *C21D 8/0447* (2013.01); *C21D 8/0452* (2013.01); *C22C 38/18* (2013.01); *C22C 38/32* (2013.01); *C22C 38/38* (2013.01); *C22C 38/54* (2013.01); *B60B 2310/54* (2013.01); *B60B 2310/542* (2013.01); *B60B 2360/102* (2013.01); *B60B 2360/141* (2013.01); *B60B 2900/111* (2013.01); *C21D 9/34* (2013.01); *C22C 38/002* (2013.01); *C22C 38/04* (2013.01); *Y02T 10/86* (2013.01); *Y10T 428/12229* (2015.01); *Y10T 428/12951* (2015.01); *Y10T 428/12958* (2015.01); *Y10T 428/12965* (2015.01); *Y10T 428/12972* (2015.01); *Y10T 428/12979* (2015.01); *Y10T 428/2495* (2015.01); *Y10T 428/24942* (2015.01)

(58) Field of Classification Search
CPC .... B60B 3/12; B60B 3/04; B60B 3/00; B60B 21/00; B60B 2310/542; B60B 2310/54; B60B 2360/102; B60B 2360/141; B60B 2900/111; Y02T 10/86; C21D 7/00; C21D 7/02; C21D 7/13; C21D 9/34; C21D 8/00; C21D 8/005; C21D 8/0205; C21D 8/0221; C21D 8/0226; C21D 8/0231; C21D 8/0236; C21D 8/0242; C21D 8/0421; C21D 8/0442; C21D 8/0447; C21D 8/0452; C21D 8/04; C21D 8/0405; C22C 38/002; C22C 38/04; C22C 38/18; C22C 38/38; C22C 38/32; C22C 38/54; B21D 22/20; B21D 22/208; Y10T 428/12229; Y10T 428/12951; Y10T 428/12958; Y10T 428/12965; Y10T 428/12979; Y10T 428/12972; Y10T 428/2495; Y10T 428/24942
See application file for complete search history.

(56) References Cited

U.S. PATENT DOCUMENTS

| | | |
|---|---|---|
| 2011/0227400 A1 | 9/2011 | Stich et al. |
| 2016/0067763 A1 | 3/2016 | Graff et al. |

FOREIGN PATENT DOCUMENTS

| | | |
|---|---|---|
| DE | 102008048389 A1 | 6/2010 |
| DE | 102008048389 B4 | 2/2015 |
| DE | 102014008718 B3 | 2/2015 |
| DE | 102014112755 A1 | 3/2016 |
| EP | 2326517 B1 | 6/2011 |

* cited by examiner

CHASSIS COMPONENT HAVING HIGH DURABILITY

CROSS-REFERENCE TO RELATED APPLICATIONS

This application is the United States national phase of International Application No. PCT/EP2017/070060 filed Aug. 8, 2017, and claims priority to German Patent Application No. 10 2016 115 036.3 filed Aug. 12, 2016, the disclosures of which are hereby incorporated by reference in their entirety.

BACKGROUND OF THE INVENTION

Field of the Invention

The invention relates to a chassis component for a motor vehicle, wherein the chassis component is manufactured at least partially from a multi-layer steel sheet, wherein the multi-layer steel sheet comprises at least three steel layers comprising two outer and one inner steel layer. The invention also relates to a method for producing a chassis component for a motor vehicle, in particular a chassis component according to the invention, in particular a wheel or a part thereof.

Description of Related Art

Motor vehicle wheels (also referred to colloquially as wheel rims) as one example of a chassis component may for example be cast from light metal. As an alternative to this, it is also known for motor vehicle wheels or wheel rims to be produced in a sheet-metal construction from steel. Here, steel wheels or wheel rims are distinguished by a low production price and good usage characteristics. Here, it must be taken into consideration that the wheel is a safety-critical component and is subjected to extremely high mechanical loads during continuous operation, such that, in particular, the service life plays an important role. However, with regard also to a minimization of the unsprung masses of the vehicle, forged wheels composed of light metal are considered to be particularly expedient owing to their low weight. This is because, with increasing mass, the wheel weight has an adverse effect on the unsprung masses (chassis), rotational inertia and fuel consumption. However, it has meanwhile likewise become possible, at a considerably lower production price, to manufacture motor vehicle wheels from strong and nevertheless easily deformable sheet steel, which can comprise an even lower weight owing to their low wall thickness.

Here, motor vehicle wheels or wheel rims manufactured in a sheet-metal construction are generally assembled from a so-called wheel-rim band and a wheel disk. Whereas, during use, the wheel-rim band provides the mounting for the tire, the wheel disk produces the connection of the wheel to the respective wheel hub. As a joining technique between the two wheel components of wheel-rim band and wheel disk, use is for example made of welding, for example MAG welding.

Wheel components composed of steel are nowadays without exception produced by cold working in multi-stage processes (deep-drawing, flow-forming, profiling). For example, DE 10 2008 048 389 B4 has disclosed a wheel for a motor vehicle, wherein the steel sheet is cold-worked. The wheel disk is in this case composed of different steel layers with an inner core layer of relatively low strength. Here, the carbon content of the outer layers is limited to at most 0.2 wt. % in order to be able to ensure the cold-working capability of the wheel disk.

To be able to achieve further weight reductions, it would be necessary to firstly compensate the loss of stiffness in the case of a smaller sheet-metal thickness by means of geometrical adaptations, and/or secondly use material with even greater strength or vibration resistance in order to reliably accommodate the operational loads.

In relation to the problem of deformability, the prior art has likewise disclosed the possibility of hot working, with which it is duly basically possible to achieve high deformability with simultaneously high strength. In order that the high material strength of hot-working steels can however be converted into increased component performance, potential weak points must be eliminated, wherein here, the joining technique often constitutes the limiting factor. In particular, the predominantly used welding methods such as MAG welding or resistance spot welding lead to tempering effects of the martensitic structure as a result of the melting of the base material and the high temperatures. As a result, a softening zone forms in the region of the weld seam, which softening zone is distinguished by a relatively low strength and simultaneously low ductility. During operation, owing to the fluctuating loads or in the event of a crash, in conjunction with the metallurgical and geometrical notch, this often leads to premature failure in the region of the weld seam.

An additional problem is that, aside from the high material strength, comprises only low ductility, and can thus exhibit critical behavior in the event of overloading in the wheel (for example misuse load situation, curb impact). Furthermore, owing to the high strength, the material can exhibit a tendency for hydrogen embrittlement. The high material strength thus cannot be readily converted into higher component performance, and the lightweight construction reaches its technical limits here.

In this respect, it has hitherto been assumed that, in the case of chassis components of sheet-steel construction, further increased component performance cannot or cannot readily be economically achieved, because an increased strength either has the effect that the required degrees of deformation can no longer be achieved, or else opposes other characteristics, such as for example adequate joining capability (welding suitability).

SUMMARY OF THE INVENTION

The invention is now based on the object of specifying a generic chassis component for a motor vehicle and a method for producing a chassis component for a motor vehicle, which is distinguished by an extremely low weight with simultaneously high durability.

The object is achieved, in the case of a generic chassis component, in that at least one outer steel layer of the multi-layer steel sheet comprises a tensile strength of greater than 1200 MPa.

By means of comprehensive internal tests, it has firstly been identified that the steel materials with high strength, in particular with a predominantly martensitic structure, exhibit a particularly high flexural fatigue strength, and thus ideally suited to use in components which are subjected to high fluctuating continuous loading, such as for example chassis components and in particular steel wheels or wheel rims.

Secondly, it was unexpected that, contrary to the previous assumption, steel sheets with a strength of greater than 1200

MPa can, in a multi-layer steel sheet with at least three steel layers, be used as an outer steel layer without however being exposed to the disadvantages presented in the introduction, such that, despite the high strength, simultaneously high durability can be achieved.

By virtue of the fact that the multi-layer steel sheet comprises at least three steel layers and thus at least one inner steel layer, it is firstly possible, despite the high strength of at least one outer steel layer, to permit adequate welding suitability. This is because, as a result of mixing of the constituents of the materials of the multi-layer steel sheet in the region of the weld seam, the overall hardening can be reduced. Furthermore, it is advantageously possible to achieve considerably lower sensitivity to hydrogen-induced crack formation, because the overall strength of the multi-layer steel sheet can be reduced for example by means of the at least one inner layer, and the internal stresses can be dissipated by means of an inner layer. Furthermore, the component loads of chassis components are concentrated primarily at the component surface, such that a high strength of the boundary layers has a positive effect on the service life of the component. As a result, it is thus possible, contrary to the previous assumption, for steel materials with a considerably higher strength to be used in a chassis component of sheet-steel construction.

The tensile strength as a material characteristic is understood to mean the maximum mechanical tensile stress that the material withstands before breaking or tearing. The tensile strength is understood in particular to mean the tensile strength $R_m$.

If the multi-layer steel sheet comprises only three steel layers, the three steel layers are preferably arranged one on top of the other and directly connected to one another, for example by means of roll-bonding. It is however likewise possible for further intermediate layers to be provided between an inner steel layer and one or both outer steel layers.

The multi-layer steel sheet may preferably comprise an inner steel layer, or core layer. It is however likewise conceivable for further inner steel layers to be provided.

It is preferable for both outer steel layers of the multi-layer steel sheet to comprise a tensile strength of greater than 1200 MPa. In this way, it is possible to provide a chassis component with altogether further improved durability.

The at least one outer steel sheet, preferably both outer steel sheets, is/are preferably composed of an entirely martensitic steel material. It has been found that entirely martensitic steel materials exhibit particularly high flexural fatigue strength, and thus ideally suited to use in continuously loaded chassis components.

In one embodiment of the chassis component according to the invention, at least one outer steel layer, preferably both outer steel layers, of the multi-layer steel sheet comprises a tensile strength of at least 1500 MPa. It is furthermore preferably possible for at least one outer steel layer, preferably both outer steel layers, of the multi-layer steel sheet to comprise a tensile strength of at least 1900 MPa or even of at least 2100 MPa. It has been found that, even at this strength, the disadvantages that are in fact to be expected as a result of the high strength, such as lack of weldability or hydrogen-induced crack formation, can be compensated by means of a multi-layer steel sheet.

In a further embodiment of the chassis component according to the invention, an inner steel layer of the multi-layer steel sheet comprises a lower tensile strength and/or greater ductility, and in particular welding suitability, than at least one outer steel layer, preferably than both outer steel layers.

Here, the elongation at fracture (for example the elongation of fracture $A_{80}$) may serve as a measure for the ductility. In this way, the strength of the outer layer can, despite the high strength, be compensated by the inner layer, and it is thus possible in particular for the welding suitability to be maintained, and for crack formation owing to internal stresses to be reduced.

For example, an inner steel layer of the multi-layer steel sheet comprises a tensile strength of at most 1000 MPa, preferably at most 800 MPa, particularly preferably at most 600 MPa. For example, an inner steel layer of the multi-layer steel sheet comprises an elongation at fracture Ado of at least 10%, preferably at least 15% (in the hardened, heat-treated and/or hardened and tempered state).

For example, an inner steel layer of the multi-layer steel sheet comprises a lower carbon content than one or preferably both outer steel layers. For example, an inner steel layer is composed of a steel material with a carbon content of at most 0.15 wt. %, preferably at most 0.1 wt. %. For example, an inner steel layer is composed of a steel material MBW500, which aside from iron and inevitable impurities comprises (in wt. %) up to 0.10% C, up to 0.35% Si, up to 1.00% Mn, up to 0.030% P, up to 0.025% S, at least 0.015% Al, up to 0.10% Nb, up to 0.15% Ti and/or up to 0.005% B. Cr and Mo may optionally be included in a sum total of at most 0.5%.

In a further refinement of the chassis component according to the invention, the multi-layer steel sheet comprises at least one steel intermediate layer arranged between an outer steel layer and an inner steel layer, wherein the tensile strength of the steel intermediate layer is less than that of the outer steel layer and greater than that of the inner steel layer, and/or wherein the ductility of the steel intermediate layer is greater than that of the outer steel layer and less than that of the inner steel layer.

For example, the multi-layer steel sheet comprises one inner steel layer and, on both sides, in each case one outer steel layer, wherein in each case one steel intermediate layer is provided between the inner steel layer and an outer steel layer. The multi-layer steel sheet is thus, in one embodiment, constructed in at least five layers. This permits further tailored characteristics of the chassis component, and can altogether permit an additional increase in strength of the chassis component.

In a further embodiment of the chassis component according to the invention, the multi-layer steel sheet is hardened, in particular press-hardened or hardened and tempered. By means of hardening, it is possible in a particularly economical manner to achieve high strength of the outer steel layers. The hardening may be performed for example as press hardening as part of a hot working process. The hardening may however also be performed subsequently to a cold working process. The hardening may likewise be performed as part of a hardening and tempering treatment process. The at least one outer steel layer is thus composed in particular of a hardenable steel or steel for hardening and tempering. It is basically also possible for an inner steel layer to be hardened and composed of a hardenable steel, wherein here, it is however preferable that a lower strength and/or higher ductility is realized in relation to at least one outer steel layer. Alternatively, for some applications, the material composite may also be only cold-worked if the tensile strength of greater than 1200 MPa is attained in at least one layer beforehand.

In a further embodiment of the chassis component according to the invention, the multi-layer steel sheet is a hot-worked, warm-worked or cold-worked steel sheet. Particularly advantageously high deformability with simultaneously high strength can be achieved in particular by means of hot working (above the recrystallization temperature). A high strength can then be achieved economically for example by means of press hardening. It has however been found that cold working may likewise be performed. To nevertheless attain a high strength, hardening, or hardening and tempering, may preferably be performed subsequently to the cold working. In the case of warm working, the workpiece is warmed but only to a temperature below the recrystallization temperature, whereby the advantages of hot working (easier deformability and greater deformation capability) can be combined with the advantages of cold working (strain hardening, greater accuracy).

In a further embodiment of the chassis component according to the invention, at least one outer steel layer, preferably both outer steel layers, and/or an inner steel layer is composed of a steel for hardening and tempering, in particular a manganese-boron steel. If one or more steel intermediate layers are provided, these are preferably likewise composed of a steel for hardening and tempering, in particular a manganese-boron steel. For example, at least one outer steel layer, preferably both outer steel layers, an inner steel layer and/or a steel intermediate layer is composed of an alloyed or non-alloyed steel for hardening and tempering.

For example, at least one outer steel layer or a steel intermediate layer is composed of manganese-boron steel MBW1500, which aside from iron and inevitable impurities comprises (in wt. %) up to 0.25% C, up to 0.40% Si, up to 1.40% Mn, up to 0.025% P, up to 0.010% S, at least 0.015% Al, up to 0.05% Ti, up to 0.50% Cr+Mo and/or up to 0.005% B. With such a steel, it is for example possible to attain tensile strengths $R_m$ of over 1500 MPa.

In a further example, at least one outer steel layer or a steel intermediate layer is composed of manganese-boron steel MBW1900, which aside from iron and inevitable impurities comprises (in wt. %) up to 0.38% C, up to 0.40% Si, up to 1.40% Mn, up to 0.025% P, up to 0.010% S, at least 0.015% Al, up to 0.13% Ti, up to 0.50% Cr+Mo and/or up to 0.005% B. With such a steel, it is for example possible to attain tensile strengths $R_m$ of over 1900 MPa.

In a further example, at least one outer steel layer or a steel intermediate layer is composed of manganese-boron steel 37MnB4, which aside from iron and inevitable impurities comprises (in wt. %) 0.34% to 0.40% C, up to 0.40% Si, 0.80% to 1.10% Mn, up to 0.025% P, up to 0.008% S, 0.020% to 0.060% Al, 0.15% to 0.60% Cr, 0.020% to 0.050% Ti and/or 0.0010 to 0.0050% B.

In a further example, at least one outer steel layer or a steel intermediate layer is composed of manganese-boron steel 40MnB4, which aside from iron and inevitable impurities comprises (in wt. %) 0.38% to 0.44% C, 0.015% to 0.40% Si, 0.80% to 1.10% Mn, up to 0.020% P, up to 0.008% S, 0.020% to 0.060% Al, 0.20% to 0.40% Cr, 0.020% to 0.050% Ti and/or 0.0010 to 0.0040% B.

In a further example, at least one outer steel layer or a steel intermediate layer is composed of steel for hardening and tempering C45, which aside from iron and inevitable impurities comprises (in wt. %) 0.42% to 0.50% C, up to 0.40% Si, 0.50% to 0.80% Mn, up to 0.025% P, up to 0.010% S, up to 0.40% Cr, up to 0.10% Mo, up to 0.40% Ni and/or up to 0.63% Cr+Mo+Ni.

The described steel materials permit a high tensile strength and can be deformed by means of hot working, such that they can also be referred to as ultra-high-strength hot-working steels.

As already stated, an inner steel layer is composed for example of a manganese-boron steel MBW500.

In a further embodiment of the chassis component according to the invention, at least one outer steel layer, preferably both outer steel layers, comprises a carbon content of at least 0.2 wt. %, preferably at least 0.25 wt. %, more preferably at least 0.3 wt. %. By means of an increased carbon content, it is particularly advantageously possible to attain a high tensile strength. As already stated, it has been identified that, through the provision of a multi-layer steel sheet, it is possible for correspondingly high tensile strength to be provided, and at the same time for the demands on chassis components, in particular motor vehicle wheels or wheel rims, to be satisfied at the end for the required welding suitability to be obtained despite the extremely high carbon content. It has even been found that a carbon content of at least 0.34 wt. %, at least 0.38 wt. % or even at least 0.4 wt. % is possible.

In a further embodiment of the chassis component according to the invention, at least one outer steel layer, preferably in each case both outer steel layers, of the multi-layer steel sheet makes up at least 5% and/or at most 25% of the thickness of the multi-layer steel sheet. It has been found that adequate overall strength of the chassis component can be achieved in a reliable manner in terms of a process if an outer steel layer makes up at least 5% of the overall thickness of the multi-layer steel sheet. If the thickness of an outer steel layer is limited to at most 25% of the overall thickness of the multi-layer steel sheet, the advantageous influence of an inner steel layer on the welding suitability and on the mechanical characteristics of the chassis component remains adequately high.

In a further embodiment of the chassis component according to the invention, the chassis component is a wheel or a part thereof, in particular a wheel disk and/or a wheel-rim band. In particular in the case of motor vehicle wheels, it is necessary to attain a high strength with small sheet-metal thicknesses, and at the same time to permit the joining of individual wheel components, such as the wheel disk or the wheel-rim band, in particular by means of a welding capability. It has been found that it may already suffice if the described chassis components comprise at least the wheel disk. The wheel-rim band may be produced differently. It is however likewise conceivable for other chassis components of a motor vehicle, such as for example a link, torsion profile, stabilizer, an axle or parts thereof to be designed as described.

A motor vehicle is for example a passenger motor vehicle or a light or heavy utility vehicle, such as for example a heavy goods vehicle.

According to a second teaching of the invention, the object stated in the introduction is also achieved by means of a method for producing a chassis component for a motor vehicle, in particular a chassis component according to the invention, in particular a wheel or a part thereof, the method comprising: providing a multi-layer steel sheet, wherein the multi-layer steel sheet comprises at least three steel layers comprising two outer and one inner steel layer, wherein at least one outer steel layer of the multi-layer steel sheet permits a tensile strength of greater than 1200 MPa; deforming the multi-layer steel sheet to form the chassis component; and setting a tensile strength of greater than 1200 MPa for the at least one outer steel layer of the multi-layer steel sheet.

By means of the method, it is firstly possible to provide a chassis component which comprises a particularly high strength and flexural fatigue strength. Secondly, despite the high strength, it is possible to attain simultaneously high durability, because, by means of the multi-layer steel sheet, it is possible in particular to achieve adequate welding suitability and low sensitivity to hydrogen-induced crack formation.

A correspondingly high tensile strength of greater than 1200 MPa, preferably at least 1500 MPa, particularly preferably more than 1900 MPa, may be achieved for example by virtue of a steel for hardening and tempering, in particular a manganese-boron steel, being provided for the at least one outer steel layer, as already described.

The deformation of the multi-layer steel sheet may however also be performed with considerably lower tensile strength, that is to say in the not yet hardened, or hardened and tempered, state. Accordingly, in one embodiment of the method according to the invention, the deformation process may be a hot working process, a warm working process or a cold working process.

The setting of the high tensile strength is then preferably performed only upon or after the deformation. Accordingly, in one embodiment of the method according to the invention, the multi-layer steel sheet may be hardened, in particular press-hardened or hardened and tempered, in order to set the tensile strength.

With regard to further embodiments and advantages of the method according to the invention, reference is made to the statements relating to the chassis component according to the invention. In particular, the above or following description of preferred embodiments of the method according to the invention is also intended to disclose a correspondingly produced chassis component. Likewise, the disclosure of embodiments of the chassis component according to the invention is intended to disclose corresponding method steps for the production thereof.

BRIEF DESCRIPTION OF THE DRAWINGS

The invention will be discussed in more detail below on the basis of exemplary embodiments and in conjunction with the drawing. In the drawing.

DESCRIPTION OF THE INVENTION

Figure 1:
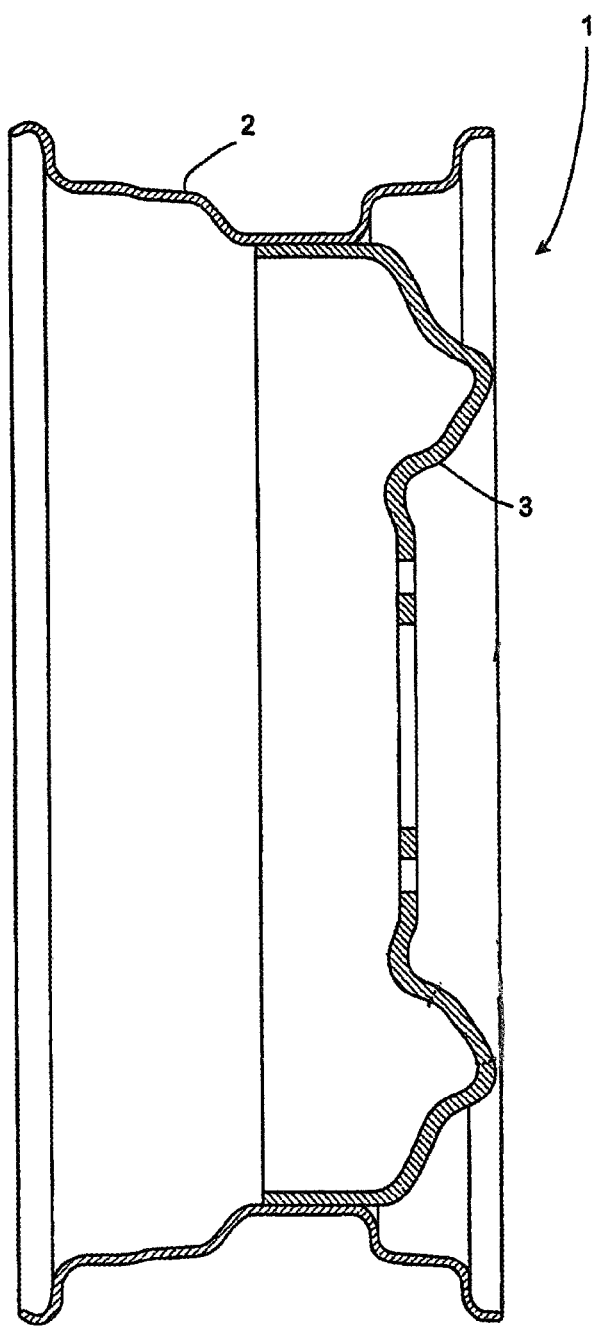
FIG. 1 is a schematic illustration of an exemplary embodiment of a chassis component according to the invention in the form of a motor vehicle wheel in section.

FIG. 1 firstly shows a schematic illustration of an exemplary embodiment of a chassis component according to the invention in the form of a wheel 1 in section. The wheel 1 is, in a known manner, assembled from a separate manufactured ring-shaped wheel-rim band 2 and a plate-shaped wheel disk 3. The wheel disk 3 is seated in the opening of the wheel-rim band 2 and lies with its circumferential surface against the inner side of the wheel-rim band 2. A non-detachable connection between the wheel-rim band 2 and the wheel disk 3 is produced by means of joints in the form of one or more weld seams or spot welds.

The wheel disk 3 and/or the wheel-rim band 2 are in this case manufactured at least partially from a multi-layer steel sheet. In this regard, FIGS. 2a-c show, in section, three exemplary embodiments of multi-layer steel sheets which can be used for producing the wheel disk 3 and/or the wheel-rim band 2.

Figure 2A:
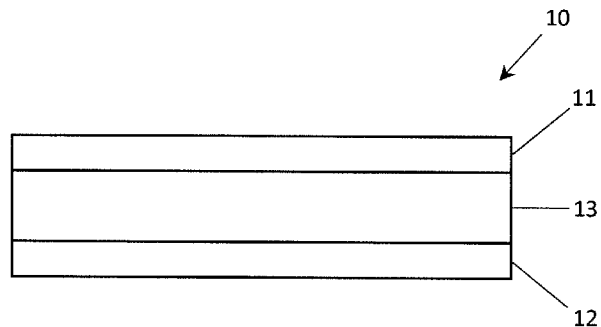
FIGS. 2a-c show three exemplary embodiments of multi-layer steel sheets in section, which may be used in exemplary embodiments of the chassis component according to the invention or in exemplary embodiments of the method according to the invention.

The multi-layer steel sheet 10 shown in section in FIG. 2a comprises three steel layers comprising two outer steel layers 11, 12 and an inner steel layer 13. The two outer steel layers 11, 12 are composed of an alloyed steel for hardening and tempering (manganese-boron steel MBW1500) and, after the press hardening, or hardening and tempering, of the steel sheet, each comprise a tensile strength of at least 1500 MPa. The two outer steel layers 11, 12 of the multi-layer steel sheet 10 each make up 25% of the thickness of the multi-layer steel sheet 10.

The inner steel layer 13 of the multi-layer steel sheet 10 comprises a lower tensile strength and greater ductility than the two outer steel layers 11, 12. The inner steel layer 13 is also composed of a manganese-boron steel (MBW500), but with a tensile strength of only approximately 500 MPa after the press hardening or hardening and tempering.

Figure 2B:
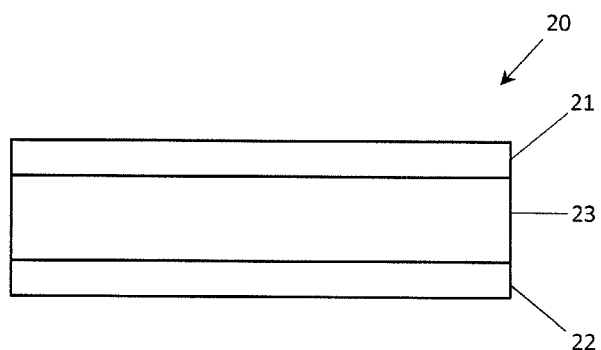
Figure 2C:
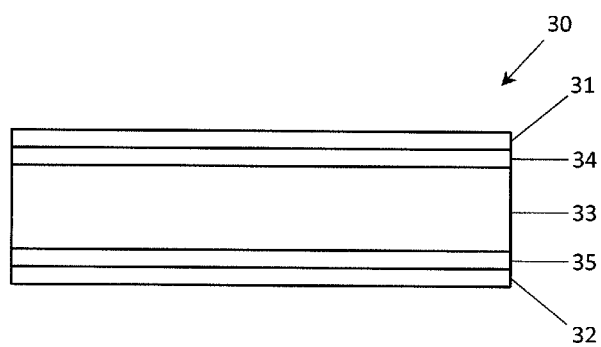

The multi-layer steel sheet 20 shown in section in FIG. 2b likewise comprises three steel layers comprising two outer steel layers 21, 22 and an inner steel layer 23. The two outer steel layers 21, 22 are composed of an alloyed steel for hardening and tempering (manganese-boron steel MBW1900) and, after the press hardening, or hardening and tempering, of the steel sheet, each comprise a tensile strength of at least 1900 MPa. The two outer steel layers 21, 22 of the multi-layer steel sheet 20 each make up less than 25% of the thickness of the multi-layer steel sheet 20.

The inner steel layer 23 of the multi-layer steel sheet 20 comprises a lower tensile strength and greater ductility than the two outer steel layers 21, 22. The inner steel layer 23 is also composed of a manganese-boron steel (MBW500), but with a tensile strength of only approximately 500 MPa after the press hardening or hardening and tempering.

The multi-layer steel sheet 30 shown in section in FIG. 2c comprises, by contrast to the steel sheets 10, 20, five steel layers comprising two outer steel layers 31, 32, an inner steel layer 33, and a total of two steel intermediate layers 34, 35, where in each case one steel intermediate layer is arranged between the inner steel layer 33 and one of the outer steel layers 31, 32. The two outer steel layers 31, 32 are composed of an alloyed steel for hardening and tempering (manganese-boron steel) and, after the press hardening, or hardening and tempering, of the steel sheet, each comprise a tensile strength of at least 2100 MPa. The two outer steel layers 31, 32 of the multi-layer steel sheet 30 each make up less than 25% of the thickness of the multi-layer steel sheet 20.

The inner steel layer 33 of the multi-layer steel sheet 30 comprises a lower tensile strength and greater ductility than the two outer steel layers 31, 32 and than the steel intermediate layers 34, 35. The inner steel layer 33 is in turn composed of a manganese-boron steel (MBW500) with a tensile strength of only approximately 500 MPa after the press hardening or hardening and tempering.

The tensile strength of the steel intermediate layers 34, 35 amounts to at least 1500 MPa, but is less than that of the outer steel layers 31, 32 and greater than that of the inner steel layer 33. Furthermore, the ductility of the steel intermediate layers 34, 35 is greater than that of the outer steel layers 31, 32 but less than that of the inner steel layer 33.

The multi-layer steel sheets 10, 20, 30 may be brought into the form of the wheel disk 3 or of the wheel-rim band 2 shown in FIG. 1 for example by hot working, warm working or cold working. Hot working may for example be combined with press hardening. In particular in the case of cold working, the cold working may be followed for example by a separate process composed of hardening and tempering.

The invention claimed is:

1. A chassis component for a motor vehicle, comprising:
a multi-layer steel sheet,
wherein the multi-layer steel sheet comprises at least three steel layers, comprising two outer steel layers and one inner steel layer, and
wherein at least one of the outer steel layers of the multi-layer steel sheet comprises a tensile strength of at least 1500 MPa and a carbon content of at least 0.25 wt %.

2. The chassis component as claimed in claim 1, wherein the inner steel layer of the multi-layer steel sheet comprises at least one of a lower tensile strength or a greater ductility than at least one of the outer steel layers.

3. The chassis component as claimed in claim 1, wherein the multi-layer steel sheet comprises at least one steel intermediate layer arranged between at least one of the two outer steel layers and the inner steel layer,
wherein at least one of a tensile strength of the steel intermediate layer is less than the tensile strength of the outer steel layers and greater than a tensile strength of the inner steel layer or a ductility of the steel intermediate layer is greater than a ductility of the outer steel layers and less than a ductility of the inner steel layer.

4. The chassis component as claimed in claim 1, wherein the multi-layer steel sheet is hardened.

5. The chassis component as claimed in claim 1, wherein the multi-layer steel sheet is one of a hot-worked steel sheet, a warm-worked steel sheet, and a cold-worked steel sheet.

6. The chassis component as claimed in claim 4, wherein the multi-layer steel sheet is one of press hardened and hardened and tempered.

7. The chassis component as claimed in claim 1, wherein at least one of the outer steel layers and the inner steel layer is comprised of a steel for hardening and tempering.

8. The chassis component as claimed in claim 7, wherein the steel for hardening and tempering is manganese-boron steel.

9. The chassis component as claimed in claim 1, wherein at least one of the outer steel layers of the multi-layer steel sheet makes up at least 5% of a thickness of the multi-layer steel sheet.

10. The chassis component as claimed in claim 1, wherein the chassis component is one of a wheel, a wheel disk, and a wheel-rim band.

11. The chassis component as claimed in claim 1, wherein the inner steel layer of the multi-layer steel sheet comprises a lower tensile strength or a greater ductility than each of the outer steel layers.

12. The chassis component as claimed in claim 1, wherein at least one of the outer steel layers comprises a carbon content of at least 0.3 wt %.

13. The chassis component as claimed in claim 1, wherein at least one of the outer steel layers of the multi-layer steel sheet makes up at most 25% of the thickness of the multi-layer steel sheet.

14. A method for producing a chassis component for a motor vehicle, the method comprising:
providing a multi-layer steel sheet, wherein the multi-layer steel sheet comprises at least three steel layers comprising two outer steel layers and one inner steel layer, wherein at least one of the outer steel layers of the multi-layer steel sheet has a tensile strength of greater than 1500 MPa and a carbon content of 0.25 wt %; and
deforming the multi-layer steel sheet to form the chassis component.

15. The method as claimed in claim 14, wherein the deformation process is one of a hot working process, a warm working process, and a cold working process.

16. The method as claimed in claim 14, wherein the multi-layer steel sheet is hardened by one of press hardening and hardening and tempering in order to set the tensile strength.

* * * * *